April 12, 1966 M. R. RICHMOND 3,246,164
COMMUTATOR FOR SEQUENTIALLY SAMPLING
A PLURALITY OF INPUT SIGNALS
Filed Jan. 29, 1962

Martin R. Richmond
*INVENTOR*

United States Patent Office 3,246,164

Patented Apr. 12, 1966

3,246,164

COMMUTATOR FOR SEQUENTIALLY SAMPLING A PLURALITY OF INPUT SIGNALS

Martin R. Richmond, Belmont, Mass., assignor to Sanders Associates, Inc., Nashua, N.H., a corporation of Delaware Filed Jan. 29, 1962, Ser. No. 169,505

8 Claims. (Cl. 307—81)

This invention relates to electrical switching apparatus and more particularly pertains to a commutator for sequentially sampling a plurality of input signals.

A commutator, in essence, is a switch which connects a number of input signal sources, each in turn for an exclusive period, to a common output terminal. It has been conventional to employ mechanical devices as commutators. Generally, the mechanical device has a rotor carrying a contact arranged to slide over a number of stationary contacts disposed in a circular path. The mechanical devices, by the necessity of having to employ a rotating member, are limited in speed of operation and by electrical contact noise common to all mechanical switching mechanisms. Moreover, the reliability of mechanical commutators decreases with age because of the wear caused by the moving parts. Electronic commutating devices have been devised to overcome the limitations of the mechanical commutators. The electronic devices, however, have usually required complex circuitry and precise bias and control voltage for accurate reproduction of low level input signals.

The object of the invention is to provide a simple, compact, and reliable commutator having no moving parts. The invention resides in a non-polarized piezoelectric member acting as the dielectric between conductive plates adhering to the member, the plates being arranged as to constitute a plurality of spaced capacitors and all the capacitors having one plate in common. Each input signal source is connected across the serial combination of a different one of the capacitors and a common load connected to the common plate. The capacitor charges to the voltage applied by the source so that the amount of charge in the capacitor is proportional to the applied voltage. By causing a shock wave to propagate from one end of the piezoelectric member toward the far end with essentially the same amplitude, the value of capacitance of each capacitor is momentarily changed as the shock wave passes. The change in capacity caused by the shock wave results in an output signal across the load as that wave reaches each capacitor, the signal being indicative of the voltage of the input signal coupled to the capacitor.

The invention, both as to its construction and mode of operation, can be better understood by a perusal of the following exposition when considered in conjunction with the accompanying drawings in which.

Figure 1:
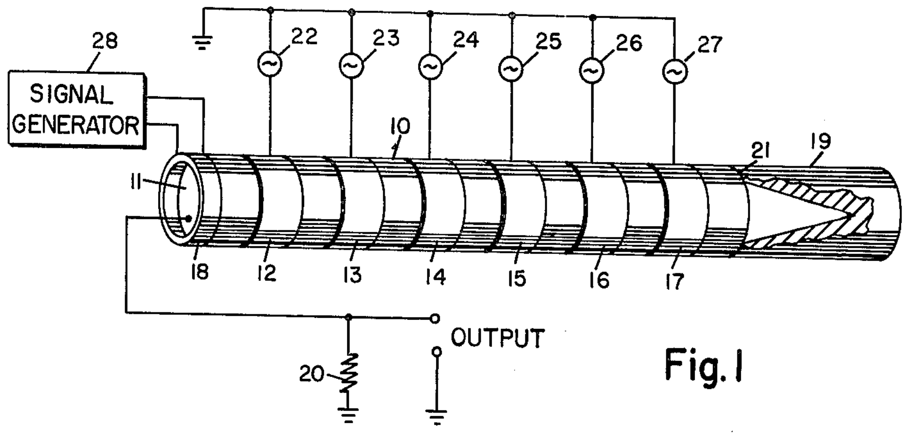
FIG. 1 depicts a preferred embodiment of the invention.

Referring now to FIG. 1 of the drawings, there is shown a hollow cylinder 10 constituted of a piezoelectric ceramic such as barium titanate. The particles of the ceramic are of random orientations so that the piezoelectric ceramic is not electrically polarized. More specifically, the structure of the ceramic is such that it is composed of crystalline grains of refractory material, the crystal structure of the grains having random orientations. Titanate ceramics are characterized by a high dielectric constant and exhibit a low power factor when placed in electric fields of high frequencies.

The inner surface of the ceramic cylinder 10 is coated with a ductile metallic film 11, such as an electrically conductive composition of silver. The silver composition is of a type which adheres intimately to the surface of the titanate ceramic. The outer surface of the cylinder is coated with the ductile metallic film in a manner such that annular silvered bands 12, 13, 14, 15, 16, and 17 are formed. The inner metallic film 11, the cylinder 10, and the metallic bands 12, 13, 14, 15, 16, 17 are analogous to a plurality of capacitors having one plate in common. One end of the cylinder 10 has a transducer 18 cemented to it. The transducer 18 is constructed to launch an elastic wave into cylinder 10, the elastic wave being of the longitudinal type so that the wave propagates as a compression or rarefaction along the titanate cylinder. The opposite end of cylinder 10 is terminated by an elastic wave energy absobing member 19. The absorbing member 19 may be simply a cylinder of lead bonded to the cylinder's end. In FIG. 1 a portion of the lead cylinder has been broken away to illustrate its hollow conical interior. The function of the member 19 is to absorb the elastic wave reaching that member so that none of the energy in the elastic wave is reflected back toward the transducer 18. Thus, at one end the cylinder 10 is provided with a member constituting a reflectionless termination for the elastic waves.

By applying a voltage to the transducer, a compressional wave is launched into the titanate cylinder 10. The compressional wave propagates axially along the cylinder. The losses in the ceramic cylinder are so slight that the compressional wave propagates with an almost constant amplitude along the cylinder until that wave encounters the energy absorbing lead ring.

Titanate ceramics, such as barium titanate, are characterized by a change in dielectric constant when subjected to mechanical stress. For example, longitudinal compression of the barium titanate ceramic cylinder causes its dielectric constant to increase whereas longitudinal tension of that barium titanate ceramic cylinder causes the dielectric constant to decrease.

A compressional wave launched into the ceramic cylinder 10 by transducer 18 moves longitudinally along the cylinder with the speed of sound. As the compressive wave front moves, it causes the dielectric constant of the ceramic occupied by the wave to increase. Hence, as the compressional wave reaches each of the bands 12 to 17 in succession, the capacity of the capacitor formed by the band and the metallic film 11 increases as a result of the increase in dielectric constant of the ceramic between the metallic films.

Figure 2:
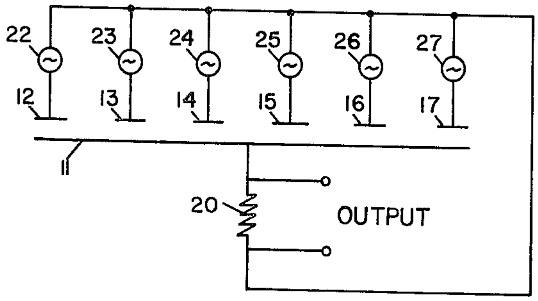
FIG. 2 is a diagrammatic representation of the preferred embodiment.

In order to utilize the ceramic cylinder as a commutator, the inner metallic film is connected by a resistor 20 to a reference potential, such as ground. Each of the bands 12 to 17 is connected to a different signal source, here depicted as signal sources 22 to 27. Each of the signal sources is connected to the same reference potential as the resistor 20. Those signal sources symbolically represent the input signals which are to be sequentially sampled by the commutator. The output of the commutator is derived across resistor 20. Each signal source is, in effect, connected in series with resistor 20 and a different one of the capacitors formed by the bands and the inner metallic film in the manner diagrammatically portrayed in FIG. 2.

Prior to the launching by transducer 18 of an elastic wave into the cylinder 10, each of the signal sources 22 to 27 causes its capacitor to charge to the voltage of the signal source.

The resistor 20 is of sufficiently small ohmic value to permit the charging rate of the capacitors to have a small time constant. Thus, the capacitors rapidly acquire a full charge.

Transducer 18, in response to an electrical pulse from signal generator 28, causes a compressional wave to enter cylinder 10 and propagate axially therealong toward the reflectionless termination 19. As the compressional wave travels along the cylinder it successively encounters the capacitors formed by bands 12 to 17. As the wave in the ceramic titanate cylinder reaches each band, it causes the capacity of the capacitor to increase. The increased capacity causes an additional flow of current into the capacitor, that flow of current appearing as a voltage drop across resistor 20.

The effect upon the capacitor of the change due to the compressional wave in the dielectric constant of the titanate ceramic can be more fully appreciated when the relationship between the charge Q in the capacitor, its capacity C, and the voltage E applied across the capacitor is considered. Since $$Q=CE$$

if E remains constant and C becomes larger, then the charge Q must increase in proportion to the increase C. Thus $$\Delta Q^{\alpha}\ \Delta C$$

It is assumed that E, the voltage applied across the capacitor remains constant. That condition will obtain in practice where the voltage of any of the signal sources 22 to 27 varies at a rate which is slow compared to the time required for the compressional wave to travel the length of the cylinder 10.

The change Q in the charge of the capacitor is related to the amplitude of the compressional wave and to the voltage impressed across the capacitor by the signal source. Since the compressional wave propagates along cylinder 10 with very small loss, the amplitude of the compressional wave remains substantially unchanged until the wave reaches reflectionless termination 19.

Therefore, where the capacitors draw different amounts of charge, upon the passage of an elastic wave through the ceramic cylinder, the differences in charge are due almost wholly to the differences in the voltage of the signal sources 22 to 27.

While the invention is shown in FIG. 1 as having an energy absorbing member 19 attached to the piezoelectric member to absorb the elastic wave energy, and that is the preferred embodiment, it is feasible to eliminate the energy absorbing member and still retain an operative device. Where the energy absorbing member 19 is eliminated, the elastic wave will reach the end of the cylinder and be reflected back toward transducer 18. Therefore, in order to have a sequential commutation of signals beginning with the capacitor formed by band 12 and ending with the capacitor formed by band 17, it is a requisite to take the output across resistor 20 only during the time the elastic wave is launched from transducer 18 and the time that wave arrives at end 21. Since that time interval is easily ascertained, a switch controlled by signal generator 28, can readily be arranged to permit output signals to be obtained across resistor 20 only during the appropriate time interval whereby the reflections cannot interfere with the commutating operation. Of course, after each commutating operation a period must be allowed for the reflected waves to die out. The transducer 18 tends to absorb much of the reflected wave energy incident upon it so that after a period of time, during which the waves are reflected back and forth, the wave energy is substantially attenuated.

While a preferred embodiment of the invention has been described, modifications can be made, and indeed are apparent, which do not materially depart from the essential inventive concept. For example, the piezoelectric dielectric member has been illustrated as a hollow cylinder because that configuration offers the greatest plate area for the several capacitors. It is evident that the piezoelectric member can have other configurations. The means for launching an elastic wave into the piezoelectric member, in a rudimentary form, may consist simply of a steel platen on the end of the member which is struck by a hammer. The hammer may be spring loaded and can be triggered by an electrical signal. More sophisticated means for launching elastic waves such as transducers which convert electrical energy into sound waves are preferably employed.

In view of the modifications which can be made, it is intended that the invention not be limited by the embodiment illustrated herein, but rather that the scope of the invention be construed in accordance with the appended claims.

What is claimed is:

1. A device comprising an elongate piezoelectric member of the type whose dielectric constant changes when subjected to mechanical stress, the piezoelectric member having two opposed surfaces of large area, an electrically conductive film adherent to and covering substantially the entire area of one of the two large area surfaces, bands of electrically conductive coatings adherent to the other of the two large area surfaces, the bands being spaced longitudinally along the piezoelectric member, each band and the electrically conductive film constituting a capacitor whose dielectric is the interposed piezoelectric member, means for launching an elastic travelling shock wave into the piezoelectric member, means at the opposite end of the piezoelectric member for absorbing the incident elastic wave, and output means connected between said electrically conductive film and a common reference point, a load connected between said electrically conductive film and said common reference point, a plurality of voltage sources connected respectively to said bands of electrically conductive coatings and said common reference point, said elastic travelling shock wave causing a change in the dielectric constant resulting in a voltage across said load, said voltage being representative of said respective voltage sources applied to said capacitors.

2. A device comprising an elongate hollow cylindrical piezoelectric member of the type whose dielectric constant changes when subjected to mechanical stress, an electrically conductive film adherent to the interior surface of the piezoelectric member, bands of electrically conductive films adherent to the exterior surface of the piezoelectric member, the bands being spaced apart, each band and the interior conductive film constituting a capacitor whose dielectric is the interposed piezoelectric member means for launching an elastic wave into the piezoelectric member, and means at the opposite end of the piezoelectric member for absorbing the incident elastic wave, a load connected between said conductive film adherent to said interior surface of said piezoelectric member and a common reference point, output means connected between said conductive film adherent to said interior surface of said piezoelectric member and said common reference point, a plurality of voltage sources connected respectively to said bands of conductive film adherent to said exterior surface and said common reference point, said elastic wave causing a change in the dielectric constant resulting in a voltage across said load, said voltage being representative of said respective voltage sources applied to said capacitors.

3. A commutator comprised of a plurality of capacitors having a common plate and having a nonpolarized piezoelectric common dielectric member, a plurality of voltage sources and a load, each of said voltage sources being respectively connected to one of said capacitors and a common reference point and said load connected between said common plate and said common reference point, an electrically actuated transducer mounted on said piezoelectric dielectric member, which when actuated produces a mechanical travelling shock wave which changes said piezoelectric transducers dielectric constant thereby changing the capacitances of said capacitors which results in output voltage signals across said load which voltage signals are representative of said respective voltage sources.

4. A commutator comprised of a plurality of capacitors having a common plate and having a piezoelectric common dielectric member, a plurality of voltage sources and a load, each of said voltage sources being respectively connected to one of said capacitors and a common reference point and said load connected between said common plate and said common reference point, transducer means mounted on said piezoelectric member for producing a shock wave along said piezoelectric member which respectively changes the capacitance of said capacitors which results in an output voltage signal across said load, said voltages being representative of said respective voltage source.

5. A commutator comprising, in combination, a tubular composite nonpolarized piezoelectric transducer, a plurality of narrow circumferentially extending conducting strips bounded to the outer surface of said piezoelectric transducer, a common conductor bonded to the inner surface of said transducer and extending along said tube opposite said strips to thereby form a plurality of capacitors having the same common conductor, a plurality of voltage sources each connected respectively to one of said separate conductive plates and a common reference point to thereby charge said capacitors, and a load connected between said common conductor and said common reference point, an electrically actuated transducer mounted on said piezoelectric transducer, for producing a mechanical shock wave along said piezoelectric transducer which changes said piezoelectric transducer's dielectric constant thereby changing the capacitance of said capacitors sequentially which results in output voltage signals across said load which voltage signals are representative of said respective voltage sources.

6. A solid state commutator comprising:

a nonpolarized piezoelectric member having a dielectric characteristic wherein its dielectric constant changes along its length, as a function of a mechanical shock wave translated along said piezoelectric member, a plurality of conductive plates spaced apart and mounted on said member, a common plate mounted on said member with said member interposed between said common plate and said plurality of conductive plates to thereby provide a plurality of capacitors having the same common plate, a plurality of signal voltage sources each connected respectively to one of said separate conductive plates and a common reference point, a load connected between said common plate and said common reference point, said capacitors being charged by said signal sources, a transducer mounted on an end of said piezolelectric member, electrical means connected to said transducer for producing a mechanically induced shock wave along said member causing the dielectric constant of each capacitor to change in turn as said wave passes, thereby producing a simultaneous change in capacity which results in an output signal across said load, said signal being representative of said respective signal sources applied to said capacitors.

7. A solid state commutator comprising:

a nonpolarized piezoelectric member having a dielectric characteristic wherein its dielectric constant changes along its length, as a function of a mechanical shock wave translated along said piezoelectric member, a plurality of conductive plates spaced apart and mounted on said member, a common plate mounted on said member with said member interposed between said common plate and said plurality of conductive plates to thereby provide a plurality of capacitors having the same common plate, a plurality of signal voltage sources each connected respectively to one of said separate conductive plates and a common reference point, a load connected between said common plate and said common reference point, said capacitors being charged by said signal sources, a transducer mounted on an end of said piezoelectric member, signal generator means connected to said transducer for producing a shock wave of a desired characteristic, electrical means connected to said transducer for producing a mechanically induced shock wave along said member causing the dielectric constant of each capacitor to change in turn as said wave passes, thereby producing a simultaneous change in capacity which results in an output signal across said load, said signal being representative of said respective signal sources applied to said capacitors.

8. A solid state commutator comprising:

a nonpolarized piezoelectric member having a dielectric characteristic wherein its dielectric constant changes along its length, as a function of a mechanical shock wave translated along said piezoelectric member, a plurality of conductive plates spaced apart and mounted on said member, a common plate mounted on said member with said member interposed between said common plate and said plurality of conductive plates to thereby provide a plurality of capacitors having the same common plate, a plurality of signal voltage sources each connected respectively to one of said separate conductive plates and a common reference point, a load connected between said common plate and said common reference point, said capacitors being charged by said signal sources, a transducer mounted on an end of said piezoelectric member, signal generator means connected to said transducer for producing a shock wave of a desired characteristic, electrical means connected to said transducer for producing a mechanically induced shock wave along said member causing the dielectric constant of each capacitor to change in turn as said wave passes, thereby producing a simultaneous change in capacity which results in an output signal across said load, said signal being representative of said respective signal sources applied to said capacitors, said shock wave being reflected back along said member upon travelling the length of said member, said signal generator being switch controlled to permit output signals to be obtained across said load during an appropriate time interval whereby said reflections cannot interfere with the communicating function.

References Cited by the Examiner

UNITED STATES PATENTS

| | | | |
|---|---|---|---|
| 1,955,471 | 4/1934 | Pooler | 310—8.1 X |
| 2,640,925 | 6/1953 | Hirsch | 310—8.7 X |

MILTON O. HIRSHFIELD, *Primary Examiner.*